(12) United States Patent
Lane et al.

(10) Patent No.: US 7,170,391 B2
(45) Date of Patent: Jan. 30, 2007

(54) BIRTH AND OTHER LEGAL DOCUMENTS HAVING AN RFID DEVICE AND METHOD OF USE FOR CERTIFICATION AND AUTHENTICATION

(76) Inventors: Kathleen Lane, 10695 Magdalena, Los Altos, CA (US) 94024; William H Lane, III, 10695 Maddalena, Los Altos, CA (US) 94024

( * ) Notice: Subject to any disclaimer, the term of this patent is extended or adjusted under 35 U.S.C. 154(b) by 0 days.

(21) Appl. No.: 10/456,454

(22) Filed: Jun. 7, 2003

(65) Prior Publication Data
US 2004/0100363 A1    May 27, 2004

Related U.S. Application Data

(60) Provisional application No. 60/428,529, filed on Nov. 23, 2002.

(51) Int. Cl.
- G05B 19/00    (2006.01)
- G06F 7/00    (2006.01)
- G08B 29/00    (2006.01)
- H04B 1/00    (2006.01)
- H04Q 1/00    (2006.01)

(52) U.S. Cl. .................. 340/5.82; 340/5.83; 340/10.5
(58) Field of Classification Search ............... 340/5.82, 340/5.83, 5.84, 10.5, 10.51, 10.52, 5.91, 340/5.92, 568.1; 709/245, 21
See application file for complete search history.

(56) References Cited

U.S. PATENT DOCUMENTS

| | | | | |
|---|---|---|---|---|
| 5,528,222 A | * | 6/1996 | Moskowitz et al. | 340/572.7 |
| 6,008,727 A | * | 12/1999 | Want et al. | 340/572.1 |
| 6,100,804 A | * | 8/2000 | Brady et al. | 340/572.7 |
| 6,111,506 A | * | 8/2000 | Yap et al. | 340/572.1 |
| 6,297,727 B1 | * | 10/2001 | Nelson, Jr. | 340/10.1 |
| 6,381,418 B1 | * | 4/2002 | Spurr et al. | 396/310 |
| 6,463,416 B1 | | 10/2002 | Messina | |
| 6,547,151 B1 | * | 4/2003 | Baldi | 235/492 |
| 6,785,739 B1 | * | 8/2004 | Tutt et al. | 709/245 |
| 6,847,299 B2 | * | 1/2005 | Franks | 340/572.1 |
| 2001/0048756 A1 | | 12/2001 | Staub et al. | |
| 2002/0005774 A1 | | 1/2002 | Rudolph et al. | |

FOREIGN PATENT DOCUMENTS

GB    2358115    * 11/2001

* cited by examiner

Primary Examiner—Michael Horabik
Assistant Examiner—Nam Nguyen
(74) Attorney, Agent, or Firm—Patrick Reilly

(57) ABSTRACT

A method and apparatus for authenticating entities to use an intelligent interactive Electronic Document Code stored in an RFID tag attached to a document as a means for third parties to ascertain a document is not counterfeit and has not been revoked or changed. In addition, such intelligent RFID tags can uniquely identify a particular document and data related to the document. The authenticating agency can utilize a public or private Electronic Document Code database as a means for the authenticating agency and third parties to authenticate documents and data in documents. The intelligent interactive Electronic Document Code can be used as an anti counterfeit mechanism enabling third parties requested to provide services, benefits or monetary payments to authenticate documents and or the data associated with the document is not counterfeit.

14 Claims, 9 Drawing Sheets

BIRTH AND OTHER LEGAL DOCUMENTS HAVING AN RFID DEVICE AND METHOD OF USE FOR CERTIFICATION AND AUTHENTICATION

RELATED PATENT APPLICATION

This application claims benefit of the priority date of the U.S. Provisional Patent Application Ser. No. 60/428,529, filed on Nov. 23, 2002, and entitled "RFID tags for legal certification of document identify and associated information," inventors Kathleen Lane and William Lane.

FIELD OF THE INVENTION

The present invention relates to devices, systems and methods used to associate and authenticate data with a document by means of a radio frequency identification device ("RFID").

BACKGROUND OF THE INVENTION

State, local and federal government agencies or their authorized agents are responsible for collecting, storing, and authenticating vital record events including birth, adoption, marriage, divorce and death and subsequently providing certified copies of such information to external parties who then rely on such printed information certified to be a true copy or extract of original life documents to authorize services and benefits to individuals. Authenticated, certified documents and extracts of information printed on certified copies was historically provided and certified as authentic by combining a corporate seal on a document with various types of watermark, barcodes or other supposed anti counterfeit paper printing processes designed to circumvent third parties from printing documents which could be perceived as authentic when such legal documents are presented as the basis for granting services or benefits to an individual.

RFID tags can be used to create and associate a digital Electronic Document Code which can uniquely identify and authenticate a specific document; said Electronic Document Code can be factory embedded during a paper printing process and/or created at print time by an authorized legal entity or its agents and attached to the printed paper, or a use a combination of factory and print processes. The Electronic Document Code creates a unique key each instance a life event or other authentic document is created and enables the use of the unique digital Electronic Document Code as a new anti counterfeit process. Said RFID tag can be included with certified documents or other authentic documents and be used to validate a document and/or the data in the document is authentic when a request for services, benefits, or monetary payment authorized by the document is made. The Electronic Document Code is embedded in a memory chip contained within a smart tag on individual documents. The chip can be scanned by a radio frequency "reader," which transmits the document's embedded identity code to a network, where "real" information about the document can be kept. That information is then communicated back from the network to provide whatever information is needed about that product to the requestor. The information stored within the RFID tag or accessed on the network can identify what entity printed the document. Each RFID tag can include a unique serial number which can identify a particular instance an authenticating agency printed a document and the data related to a particular instance of a printed document. Such related data can provide the same rights and privileges to an authentic document as a raised corporate seal or bar code does. Said digital Electronic Document Code can refer to information on the network or information stored and read within the RFID to identify who created the document and what data is related to the authentic document. Third parties can develop business processes utilizing the Electronic Document Code to validate the document and data on the document is authentic before granting services, benefits, or monetary payments to individuals presenting the documents as authentic. The digital Electronic Document Code can include a code identifying the issuer of the document, a document type, a data, and a unique serial number. When combined, these parts of the Electronic Document Code uniquely identify a particular document. Said Electronic Document Code can enable other business processes to manage and access data related to the document which may not be printed on the document or stored in the RFID tag but is available in electronic form referred and linkable in a remote database. RFID is the basis for current digital Electronic Document Codes. The RFID tag may be read only, or may utilize other tags with read-write functionality or even more advanced capabilities. Implementation of Electronic Document Codes does not depend on RFID technology; any way of being able to quickly and easily read a unique digital ID from a document will work.

The present invention relates to new methods useful to an authenticating agency or its representatives to eliminate counterfeiting of life event documents or other legal documents by associating a unique embedded intelligent Electronic Document Code with a printed document. The issuer of authentic documents can now attach hidden digital personal identity information to a printed document enabling third parties to use automated processes to authenticate and validate the authenticity of the document and an option to authenticate the individual who owns the document. Such processes are especially useful when individuals request third parties to make monetary payments or provide services based on data printed on a document. In some instances, the business processes may not require data to be printed on the physical document; the RFID tag can link to data stored on the network and available for processing by the third party.

The present invention also provides new methods useful to an authenticating agency or its representatives to collect, add maintain, store, associate, certify, authenticate and distribute digital identity data such as DNA, or other biometric information as hidden identity data within the RFID tag which can subsequently be read and verified in transactions to verify the individual representing ownership of the document is the rightful owner.

For instance, in one instance of the invention, the state Vital Records department may collect, store and subsequently certify the DNA or other biometric data collected and stored as part of each individual birth or death registration process and distribute such certified identity data as hidden data stored in the RFID on a certified birth or death certificate. The identity data certified by the authenticating agency can be made available in related transactions whereby a vital records document is used as proof of identity for benefits and services, i.e., insurance benefits, a drivers' license or a passport.

The present invention more particularly relates to the use of RFID tags by a trusted authenticating agent to create and embed a unique digital Electronic Document Code on documents which can be used by third parties as a means to authenticate the document and data related to the document. In particular, the present invention covers the use of RFID tags by authenticating agents to uniquely identify each instance of a document creation and enable third parties to reference such Electronic Document Code to validate such document and related document data as authentic, whether such data is printed on the document or available on a network. Such invention is particularly useful for authenticating agencies to eliminate counterfeiting of documents such as (1) birth and death registration processes which collect and certify personal identity, (2) other legal documents such as marriage, divorce records, and adoption records, and (3) other monetary payment documents subject to counterfeiting such as payroll checks or certified checks; and is especially useful for third parties who provide benefits, monetary payments and services to individuals who request services, monetary payment or benefits based upon data printed on the document. Such third parties can now authenticate the document is not a counterfeit document before authorizing a benefit, service or monetary payment. All parties can associate related data on the network or stored in the RFID tag with the intelligent digital Electronic Document Code.

In addition, the present invention utilizes the intelligent digital Electronic Document Code associated and attached with a life event document to provide a means of linking subsequent or prior life event data records with prior life event records. For instance, the recording and authentication of a subsequent life event such as marriage or divorce may optionally automatically identify and notify the authenticating agent who created the original birth record of a name change and to associate and link such name change with the original document and data stored on the network or in the RFID tag by developing automated business processes made available by an embedded intelligent unique document code stored on the document or a network. In an alternative embodiment, if the maiden name of an individual identified as related to an Electronic Document Code document like a birth certificate is changed when an individual is married, the recording of the marriage event and printed on a marriage license containing an RFID smart tag can link and associate the old name on the birth certificate with the new name on the marriage license. In addition, the death of an individual recorded and authenticated by a state or local government agency may automatically link to the original birth record using the RFID tag embedded with the Birth Certificate and data stored in the RFID tag or on the network.

The invention covers the use of RFID tags to create a unique digital intelligent Electronic Document Code which can identify the authenticating agency who issued the document, a document type, and a unique serial number which are combined together to create a unique Electronic Document Code for every instance a document is printed. Third parties can build automated business processes to validate and authenticate the document, or data authorized by the document is not counterfeit. In some instances, the data related to the Electronic Document Code can establish business processes whereby a document can be presented for services for only one time, or a specified number of times. Automated business processes would enable third parties requested to provide services, benefits or monetary payment to know such service has been provided, enabling such third party to not provide requested services.

The invention covers an ability to validate that a life event document is authentic and/or validate that all of some of the data contained in a life event document or record is authentic.

The integration of radio frequency identification ("RFID") circuit tags as an intelligent digital electronic document code enabling the tracking and authentication of hard copy documents and data related to the documents is a convergence of technologies that is often useful for authenticating agents in managing document identification and deterring counterfeit or other unauthorized copies of certified or other legal documents.

The Electronic Document Code may identity and provides automated links to the original records used to create the document and can also be used as a unique key for associating other data and transactions related to each document.

The ability to associate individual identity data as part of the RFID tag attached to the document also enables authenticating agents to include access to such identity data stored as hidden data on the RFID tag or on the network and enable third parties processing such documents to utilize such identity data to authenticate the owner of the document.

As one example, U.S. Pat. No. 6,463,416 discloses an authentication system for identification documents. However, the prior art does not anticipate or suggest an original storing of an intelligent Electronic Document Code with the documents that can be used to identify which trusted authenticating agency created the document and the data on the document, or develop automated processes which utilize the Electronic Document Code as a way of authenticating the document and related data. Further, the process does not vision the birth registration process to include and authenticate unique identity data such as DNA or biometrics as part of the birth registration record, which may be subsequently associated with the birth registration record through the RFID tag as either hidden data stored in the tag or on the network. Such digital identity data may be used by the individual to validate they are who they say they are in subsequent business transactions. Further, the process does not envision the use of a unique EPC code on a document to facilitate the development of business processes which can use the EPC code to validate the authenticity of the document and associate data related with the documents, i.e., update identify information with subsequent transactions recording of life events which impact such identity information, or find out if the authenticated information provided by the authenticating agency has been revoked. In addition, U.S. Pat. No. 6,463,416 neither anticipates nor suggests employing an Electronic Document Code back to an EDC database for validation and authentication of documents and data. A search of known patents covering RFID show none relevant to the development of a unique intelligent Electronic Document Code which can be used to eliminate the counterfeiting of life event documents such as birth certificates, death certificates, marriage licenses or divorce or the use of adding and authenticating digital identity data with the birth registration record which can be embedded and hidden within the Electronic Document Code for third party transactions which can authenticate the owner of the document when applying for services, benefits or monetary payments.

For instance, United States Patent Application Serial Number 2001/0048756 ("application 8756") discusses the use of DNA as a means of identifying newborns and using such information to verify the relationship of the mother and the child and as a means for future identification of a child. However, application 8756 does not include nor anticipate the association and authentication of the DNA with the individual birth registration process and the subsequent distribution of such authenticated identity data by a state or local registrar when printing a certified copy of a birth record uniquely identified with the RFID tag embedded on the birth certificate document.

United States Patent Application Serial Number 2002/005744, entitled RFID Tag for Authentication and Identification, neither discloses nor anticipates the use of the RFID tag to presenting rights similar to a corporate seal whereas certain alternate preferred embodiments of the method of the present invention provides a structure of an RFID tag that can identify authenticating agency that (1) created the corporate seal and/or (2) attests the data on the document is authentic. Furthermore, United States Patent Application Serial Number 2002/005744 ("application 5744") does not envision the use of an Electronic Document Code, as comprised within certain alternate preferred embodiments of the method of the present invention, for third parties to access related data on a network and to associate other transactions to a document based upon or in reference to an Electronic Document Code corresponding to the document. Nor does application 5744 refer to the ability of the authenticating agency to include "hidden" personal identity data as part of the RFID tag to be used a means to assure the bearer of a certified document is the owner of the document, as is included within certain alternate preferred embodiments of the method of the present invention. Application 5744 purports to authenticate the recipient of a document, but does not disclose nor anticipate any processes whereby the RFID tag may be used to authenticate the entity that created the document and a means to authenticate the document is not a counterfeit document, as is included within certain still alternate preferred embodiments of the method of the present invention.

The existing federal standards defined for states to collect and store birth, death and other vital record events do not reference the recording and storing of unique identity data such as DNA or biometrics with authenticated birth records which can subsequently be provided as authenticated information about an individual by the state or local government agency preserving such birth records.

No processes are known adapting the use of intelligent RFID tags as an Electronic Document Code for the purpose of uniquely identifying an instance of a legal document and the authenticating entity who issued the document. No known processes are known where authenticating agencies embed or attach RFID tags uniquely identifying a document and the data in the document whereby such unique electronic document code enables third parties to validate the document is authentic and the data referenced on the document is authentic. No known processes exist which enable third parties to utilize the RFID tag as a means of authenticating the document is not a counterfeit document. The invention utilizes the development of an Electronic Document Code schema to uniquely identify the entity creating the document, the unique instance of each document, the data related to each unique instance of a document, and a process uniting other parties involved in a document workflow when such third party automated processes utilize the Electronic Document Code stored in the tag to read, write and store data stored in the tag or available on a network. The net effect of the invention is to prevent counterfeit documents being used to request and receive benefits, services or monetary payments from third parties who can now validate the documents and the related data are authentic.

The existing standards for recording other life events records such as marriage or divorce do not include processes for using the intelligent Electronic Document Code included as part of the printing of a certified copy of a Birth Certificate to link and associate other events related to an individual such as marriage or death which can enable the owner of the life event data records to link and associate recordings of future life event with prior life events databases.

RFID circuit tags, also referred to herein as RFID circuits and RFID tags are presently manufactured and used to track a plethora of items and materials, from items of apparel to volumes of coal as stored by grade and quality. Alien Technology, mentioned as one exemplary manufacturer, provides a 915 MHz RFID tag with 64 bits of field programmable memory and 16 bits of CRC. Yet the prior art fails to suggest or anticipate the use of RFID tags as an intelligent Electronic Document Code for federal, state or local government to certify life event and other legal documents with a unique digital intelligent code or the ability for third parties to use an intelligent Electronic Document Code to be used to assure a document is not counterfeit. No such prior art is known where agencies responsible for collecting and storing birth registration records collect an authenticate DNA or other biometric data as part of an individual birth record and enables a birth document to include such digital identity data as hidden digital data using the intelligent attributes of RFID tags.

It is an object of the present invention to provide new business processes to store, collect, distribute, and maintain unique identity data such as DNA or other biometric information about an individuals as part of a life event record maintained and authenticated by a certifying agency or its agents. Such unique identity data can be made available as hidden data embedded in an RFID tag on life event documents such as birth certificates and used as a means to track and link other life event transactions.

The existing MIT Auto-ID center is developing processes and procedures for authenticating and tracking products using a unique product code available to third parties for use in supply chain management processes. The existing Electronic Product Code descriptions apply to products, not documents.

SUMMARY OF THE PRESENT INVENTION

Towards this and other objects made obvious in light of the present disclosure, a method and system are provided to utilize intelligent RFID technology as a unique Electronic Document Code whereby such intelligent Electronic Document Code can be added to each printing of certified or other legal documents to uniquely identify the document and prevent other parties from counterfeiting such certified or legal documents. The RFID tag enables existing passive printed documents to become smart and interactive, enabling automated processes to validate a document and data related to the document is real, not counterfeit nor revoked, when a document is presented to request and receive services, benefits or monetary payments. The invention also enables new automated business processes which can "read" hidden invisible digital data embedded in an RFID attached to a paper document. The invention stores a unique Electronic Document Code within the RFID and associates the RFID tag with a specific document and a specific transaction enabling third parties to easily identify the authenticating agency that created the document and authenticate the document and the data on the document. The invention uses the EDC code as a means for third parties to be assured a document being presented is an authentic document. The invention also uses the EDC code as a database pointer enabling automated business processes to access data related to the document stored in a network database.

In addition, authenticating agencies can elect to collect, store, certify and distribute identity data associated with the individual identified on the authenticated document, including but not limited to DNA. Biometrics, or other unique identifying data as hidden data stored in an RFID tag. Said hidden identity data can be used in automated business processes to validate the owner of the document The RFID tag may also include and associate a GPS chip to the document for future tracking and location of legal documents.

In certain preferred embodiments of the present invention the method of the present invention is applied within an information technology system. The information technology system ("IT system") may comprise a communications network or a distributed computer network, such as an Intranet, an extranet or the Internet. The IT system may optionally comprise RFID tags coupled with documents, physical objects, assets, physical assets, certificates, information storage modules, electronic devices, equipment, machinery, animals, livestock, plants, suitable biological entities or materials, suitable inorganic material, minerals, metallic ore, hydrocarbon fuels, and/or vehicles. Documents types requiring authentication may be birth certificates, death certificates, marriage licenses, divorce decrees, and adoption. Transactions requiring authentication of documents or data related to the documents may be applications for a marriage license, adoption, a passport, insurance or driver's licenses. RFID tags may be embedded in printed authentic documents by a paper manufacturer when the paper is printed or may be attached to the document as part of a computer print process. Some combination of factory printing and local computer printer printing may be applied to read and store all elements of the EDC. The certified copy printing process may write and store a serial number on the tag, or the serial number may be attached to the paper during the paper printing process and the IT process reads the serial number stored in the RFID and associates it with the data file/request for an authentic document. In either embodiment, the certified document printing process will provide rules and processes for when and how to read or store Electronic Document Code information, dependent on whether an RFID tag is embedded in the paper at paper print or will be added when the document is printed on a local printer. The unique Electronic Document Code is recorded and made available to third parties through an Electronic Document Code database available on the Internet. In some instances, the RFID tag may store not only a unique number identifying the transaction but may also store related data such as user name or Social Security Number. The amount and types of data stored in the RFID tag or linked and accessible via remote databases is a fluid definition and may change as new RFID technology allows more data to be stored and accessible in the RFID tag. In other instances, the RFID tag serial number may point to an external Electronic Document Code Database which can identify the location of a data record users can access or associate other business processes with. The IT system may further or alternatively optionally employ RFID write systems and/or read systems whereby information may be written into RFID tags and read from RFID tags.

In a first preferred embodiment of the method of the present invention, an authenticating agent (e.g., person, official, software agent, or agency who is a trusted source or conduit of authenticating data), collects, records and stores data documenting official birth, adoption, marriage, divorce or death registration events. When requests are made to the authenticating agency for certified copies of such official information, the authenticating agent utilizes RFID technology to create and attach a unique intelligent Electronic Document Code in each instance a certified copy of an official record is printed. Said EDC can identify and allow third parties to authenticate documents and information associated with said documents. The Electronic Document Code may also point to the location of the database record(s) used by the authenticating agency as a data source for creating the certified document, and access codes determining whether such database records or RFID data fields can be read or written to in transactions requiring validation of identity. The IT processes can include maintaining an audit trail of entities requesting validation of identity in data transactions using such documents to validate/verify the data on the document. The present invention enables the recording of subsequent life event records related to the individual to update identity data stored in the RFID chip and may also notify the source authenticating agency or agent maintaining a life event record such as a birth registration record of a subsequent life event record, such as marriage, divorce or death.

In the second preferred embodiment of the method of the present invention, an authenticating agent collects, stores, associates and authenticates unique identity data with stored records used as a data source for creating and printing certified documents. The same or another authenticating agent may then include a digital representation of said unique identity data such as DNA or other biometric data and use such data to authenticate the individual who owns the documents in subsequent transactions. In the second embodiment of the invention, the invention associates an RFID tag with a printed document or card or semiconductor device which uniquely codes and identifies the source agency or agent authenticating and certifying life event records whereby said chip can be embedded within a human and used for a unique digital ID If global positioning system ("GPS") data or other IT information (user code attached to a street location) is available and associated with a specific life event document, the system may include IT processes to find/locate documents using normally acceptable GPS processes.

The present invention may optionally protect against identity theft by monitoring requests for copies or verification of life event documents by third parties of vital record documents, birth, death, marriage, divorce or adoption and reporting such information to a public source, i.e., a credit bureau.

The authenticating agency may also elect to distribute authenticated data electronically rather than in paper form. The authenticating agency or agent use the RFID tag as a reference to data stored on a network rather than printed on a paper document; RFID processes may require passwords or other identifying data for third parties to access remote data or other digital data stored in the RFID tag. The IT Processes of certain alternate preferred embodiments of the method of the present invention may then read the authenticating codes and keys, which may include a password, validate the code, keys and password within the RFID tag, access hidden identity data stored in the RFID tag or in a remote database according to rights and privileges assigned by the authenticating agency. An optional IT process may thereupon develop processes and procedures enabling individuals to authorize electronic access to identity data stored in the RFID tag or stored in a remote database for subsequent use/inclusion in other identity documents and authenticating agents to assure an authenticated agent provided such data.

Unique digital identity data may optionally be protected or authenticated by a system or technique using a password, such as a personal identification number ("PIN"), or data related to or including biometric data or DNA data. Such digital data may be included and authenticated with birth registration records and electronically included in vital record documents and files, and subsequently authenticated and made available for inclusion in auxiliary identification files, such as passports or drivers licenses. Applications for such auxiliary documents can optionally include matching or extracting the applicant personal biometric/DNA identity data as electronically collected and authenticated in the birth certificate. Such matching can be done by reading or otherwise accessing electronic files embedded in the birth certificate, or matching can be done by accessing an external database, such as the state's birth record file.

A third alternate preferred embodiment of method of the present invention may be used to by third parties requested to provide benefits, services, or monetary payments to an individual to authenticate documents which look like certified copies of vital record document are real and have not been revoked. All states and some counties of the United States maintain electronic and paper records of vital records, birth, death, marriage, divorce and adoption. Certified copies (or other copies appearing to be authentic) of these records are the basis for validating/authenticating many individual benefits, services and monetary payments. For instance, when an individual applies for a driver's license or a passport, they may be requested by a governmental authority or its agents to provide a certified copy of a birth certificate to validate individual identity. Vital records are often printed on special purpose preprinted paper with the state, county or other authenticating agent seal. The uses of special purpose paper which may include a preprinted serial number or bar code are exiting efforts to eliminate counterfeit documents. Courts also have a requirement to print authenticated documents for certification and authentication of marriage, adoption or divorce documents. The Electronic Document Code adds a unique digital code to each instance of a vital event document, making such document smart and interactive Third parties can now develop automated processes to read the RFID tag embedded in the smart document to authenticate the document is real and has not been revoked.

Certain alternate preferred embodiments of the method of the present invention provide IT processes to include a legally recognized and accepted digital code or image recognized as the representation of the authenticating agency and Verification of document data. The method of the present invention provides processes to read the RFID tag and request authentication from the authenticating agency that the data and the document are still valid or are suspect or known to be invalid. The authenticated data can be read and automatically populate the requestor database from either data in the RFID tag or data from the authenticating agency database. The authenticating agency has the right to revoke the information originally provided in the identity documents in case of errors, name changes, death or other circumstances. Such revocation will become known to the entity requesting verification/validation of the identity documents when the validation/verification of the identity data is requested from the authenticating agency. Entities requesting validation of data can also set a flag with the authenticating agency requesting notification if at a future time information validated is revoked or changed by the authenticating agent.

A third preferred embodiment of method of the present invention may be used to track documents and transactions involving the verification and validation of information contained in the certified documents and/or to track the location of the documents or entities embedded with data authenticated by the authenticating agency.

In a fourth alternate preferred embodiment of the method of the present invention, an audit trail can be kept identifying all places where a birth certificate or other life event is provided as proof of identity.

Identity Theft Management

A record of requests for copies or changes to life documents or records, such as individual birth, death, marriage, adoption or divorce records and other vital or medical records, can be shared with other IT systems or business process. For instance, information about the request for a birth certificate or a death certificate can be sent to a credit-reporting bureau. An individual can optionally review his credit report and see a record of all requests for a copy of vital records Electronic Corporate Seals In a fifth alternate preferred embodiment of the method of the present invention, an authenticating agent, system or agency may electronically sign and authenticate the birth certificate documents using an RFID tag whose coding structure enables third parties who process the RFID tag to identify what authenticating agency created the certified document. The invention utilizes the RFID tag to be recognized by legal authorities to grant such documents the same rights associated with documents bearing a Corporate Seal. The invention does not bar the inclusion of Corporate Seal visible on the printed paper. Rather, the RFID tag adds an anti counterfeit layer to the paper document.

An RFID tag with GPS capabilities might optionally be included as part of the birth or other vital record event document. This will enable tracking and locating of the document should it become lost or stolen.

Certain yet alternate preferred embodiments of method of the present invention may optionally provide in combination or singularity the following features, aspects or capabilities:

1. Database Pointer. The intelligent RFID tag embedded on the authentic documents may include a unique transaction identifier. That unique identifier enables third parties to directly access external databases storing related data. Such database pointer eliminates the need for service validation processes to enter and match data fields from the authenticating agency database. Instead, such unique Electronic Document Code can point directly to data fields stored on a network and available in various third party service processes. For instance, the Social Security may desire to authenticate a Birth Certificate is authentic before providing retirement benefits. Today, such authentication process would require the SSA to request authentication of the birth certificate by entering data from the birth certificate, sending such information to the state identified on the birth certificate, and initiate a search of the state database to find a matching record. The Electronic Document Code enables the SSA to either read stored identity data or directly access a data file containing the decedent personal identity. Although it is possible to enter data printed and visible on a document into a screen before submitting a request to the authentication database via the communications network to authenticate personal data, the ability to read an RFID tag containing a pointer to a specific authentication database and a specific database record used for authentication of the document or the data in the document facilitates the accuracy and speed of the authentication server.

With or without a direct pointer to the identification database, the authentication database or a database system may additionally or alternatively implement complex algorithms, which attempt to match and authenticate identification data.

The database pointer may optionally enable the authenticating agency to notify the requestor if the information in the database record has been changed or revoked.

2. Unique Electronic Document Code for all documents where third parties desire to ascertain the document is authentic. The unique Electronic Document Code enables the requestor to validate the documents and related data is authentic.

3. Eliminates data entry. Electronic RFID tags can be read and data stored in the RFID tag to automatically populate third party service or benefit processes, eliminating the requirement to enter a name or other identifying data to access/update the identity database. For privacy reasons, this eliminates the need or requirement in certain scenarios for someone's Social Security Administration number to be maintained in a requestor database or displayed on a screen.

4. Establishes the birth record as the primary record for authenticating digital identity. DNA is a critical piece of evidence for establishing identity. Today, various federal agencies can collect DNA about the same individual and store it in separate databases. No single agency has been designated as the single repository for identify and DNA. The method of the present invention may be employed to expand the existing birth, death and other vital record business processes established by authenticating agents to collect and distribute DNA data and the name of the individual the DNA belongs to 5. Authenticates identity ID in off line transactions. Most credit cards have added an additional data or code to a credit card account. This code is not passed through any automated systems and is not printed on a credit card transaction slip. Therefore if someone is trying, without authorization, to use a credit card in an off line transaction, they cannot do so unless they have your credit card in their physical possession. The RFID tag on an identification document can be used in the same manner, providing the same secondary level of authentication credit card processing requires for off line transactions involving identity documents such as on line applications for drivers licenses or marriage licenses.

6. Tracking authentic documents. RFID tag technology will optionally enable location tracking of authentic documents. RFID readers will be extensively deployed geographically. Such readers can silently detect the presence of RFID tags on authentic documents and log the location where the RFID tag was read.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
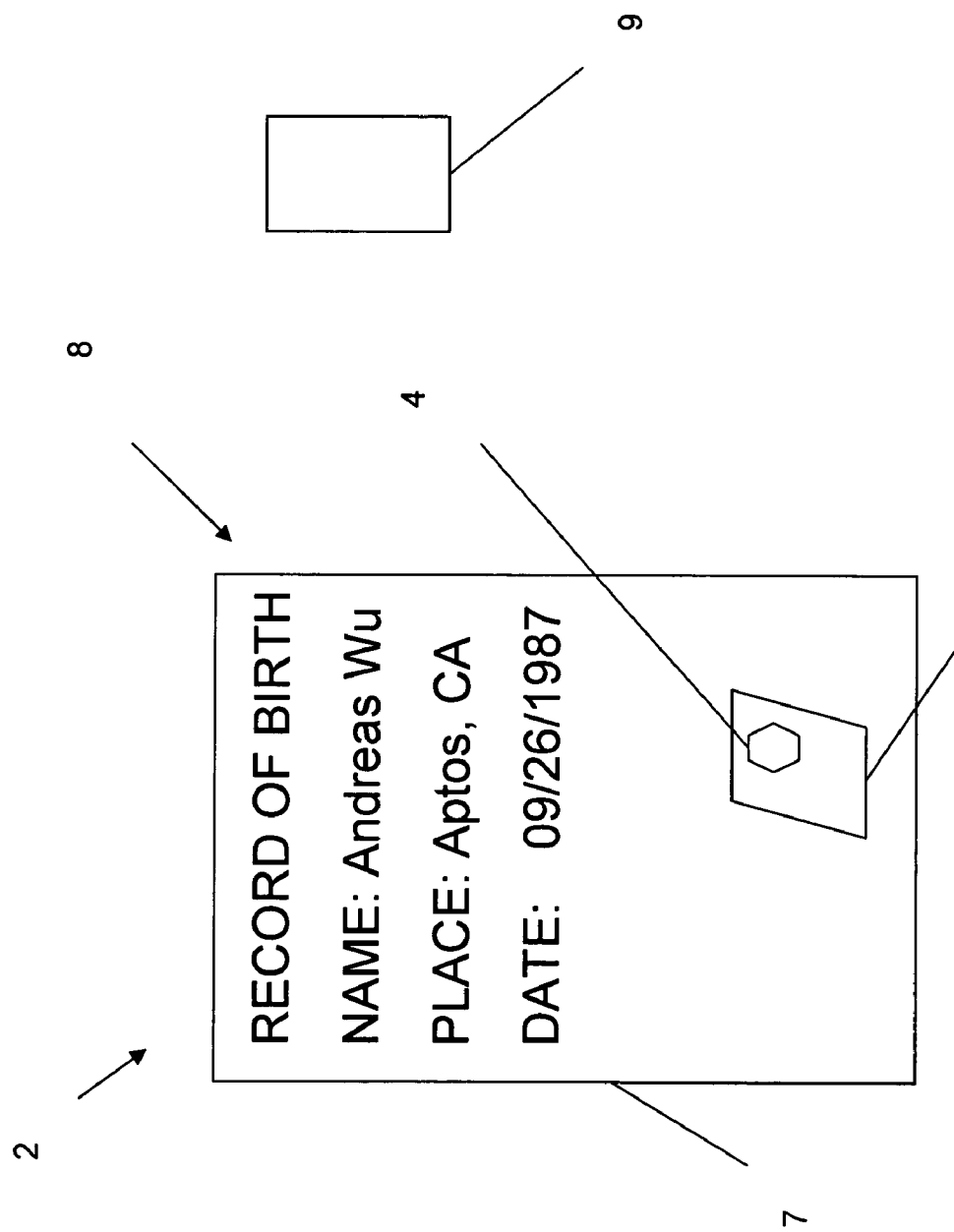
FIG. 1A is an illustration of a document bearing an RFID circuit tag with which a preferred embodiment of the method the present invention may be implemented.

Referring now generally to the Figures and particularly to FIG. 1A, FIG. 1A is an illustration of preferred embodiment of the present invention 2, or life document 2, comprising an RFID circuit tag 4 within a corporate seal 6 and attached to a paper sheet 7. It is understood that in certain alternate preferred embodiments of the present invention the sheet 7 maybe one of a variety of suitable print media known in the art, e.g., fabric, plastics, wood products, metal foils, and etc. The RFID doc 2 may be or comprise a legal document, a rebate or rebate coupon, a coupon, a Uniform Commercial Code ("UCC") document, a certified document, a document recorded by a notary public, a document certified as a valid copy by a government agency, a birth certificate, a death certificate, a passport, an educational certificate, a court judgment, a court record, a deposition, a testimony, a personal license, an automobile driver's license, a business license, a corporate document, a tax document, an ownership document, a payment document, a lien document, a payroll document, a debt document, a credit document, an ownership transfer document, a real estate title document, an asset title document, a motor vehicle title, a marriage certificate, a divorce decree, a document revision record, a check, a financial instrument, a rebate, a rebate coupon, a monetary note, a currency bill, and a contract. The paper sheet 7 includes a visual pattern 8, where the visible may be a printed image, a typewritten image, a bar code image, an embossed image, an ink image, a handwritten image, a hand drawn image, a computer generated image, a heat imprinted image, an etched image, a painted image and/or a chemically treated image.

An RFID communications device 9 is used to read and/or data from the RFID tag 4. The transmitted data may be information, such as a PKI public or private key, a personal identification number ("PIN"), biometric data, and electronic signature, or another suitable data, algorithm or data structure known in the art and used to (1) validate or authenticate data, (2) validate or authenticate an identity of a conduit, source, or destination of transmitted data, (3) or to authenticate or validate permission or authorization to read from and/or write onto the RFID tag 4.

Figure 1B:
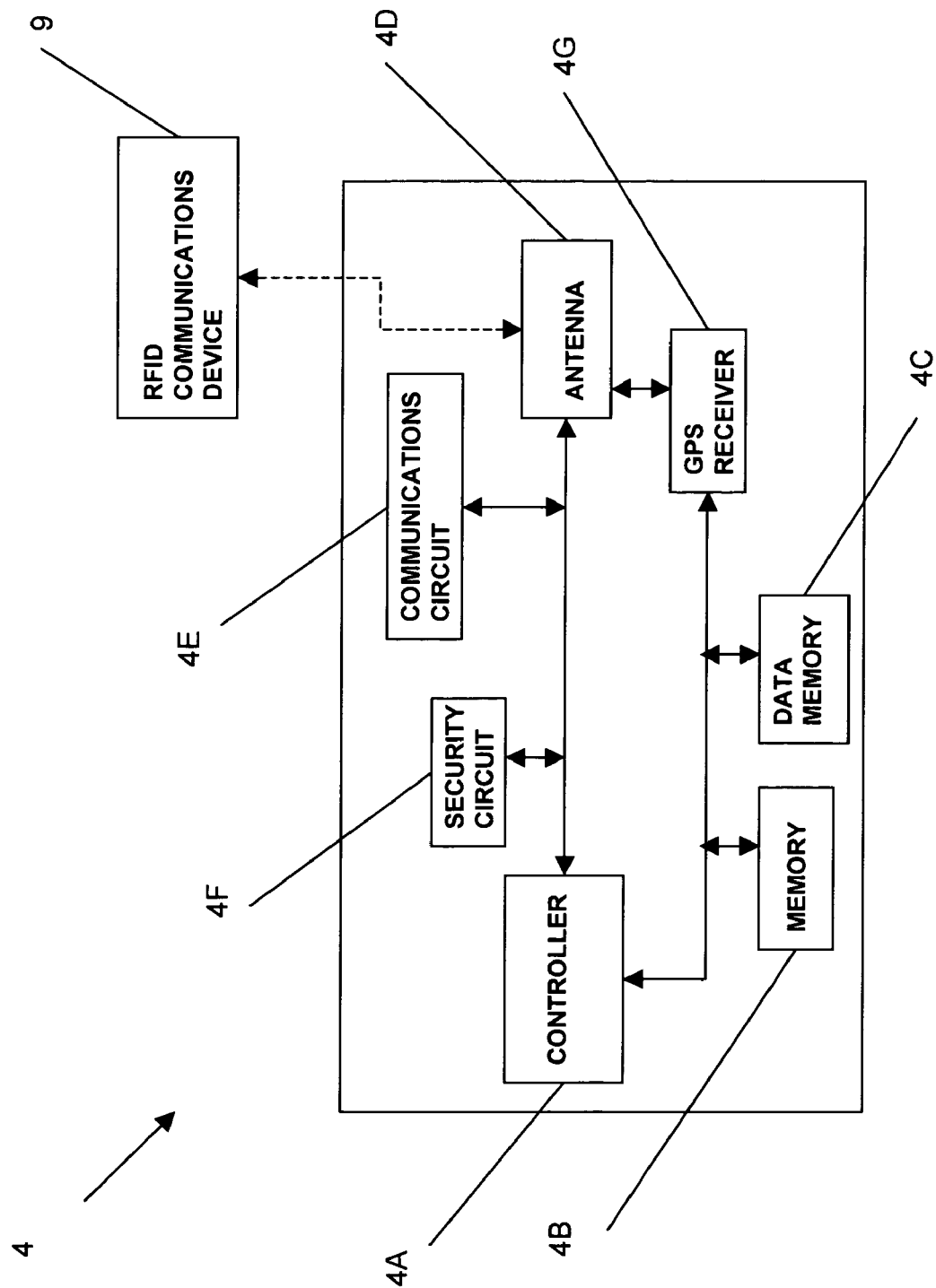
FIG. 1B is a schematic diagram of the RFID circuit tag of FIG. 1A.

Referring now generally to the Figures and particularly to FIG. 1B, FIG. 1B is a schematic diagram of the RFID circuit tag 4 of FIG. 1A. The RFID circuit tag 4, or RFID tag 4, has a controller 4A, an operating memory 4B, a writeable data memory 4C, an antenna 4D, a communications circuit 4E and a security circuit 4F. Data identifying and authenticating the identity of the RFID 2 tag are stored in the writeable data memory 4C. In certain alternate preferred embodiments of the present invention the RFID tag 4 may comprise logical circuits and/or programmable logic circuits that direct aspects of the operation of the RFID tag 4 and may partially or wholly execute the operations of the RFID tag 4 without reliance upon a software program stored within or transmitted to the RFID tag 4. In the preferred embodiment of FIG. 1A, the RFID tag 4 has a software program at least partially stored within the operating memory 4B, and relied upon to direct the operation of the RFID tag 4. The antenna 4D receives radio signals from the RFID communications device 9, or comms device 9, and delivers the received signal to the communications circuit 4E. The communications circuit 4E digitizes the received signal and transmits the digitized signal to the controller 4A. The controller 4A may then access the security circuit 4F to authenticate the identity of the comms device 9 and to determine if the comms device 9 is authorized to request information from, or write information into, or otherwise direct the operation of the RFID tag 2. Information concerning the comms device 9, and the instant attempt to access data stored in the RFID tag 2, may be recorded by the RFID tag 4 in the data memory 4C. The antenna 4D may be directed by the controller 4A to transmit radio signals to the comms device 9, wherein the radio signal includes data stored in the data memory 4C. The communications circuit 4E acts as enabler for these transmissions from the RFID tag 4 and provides a transmittable signal to the antenna 4D. It is understood that the prior art and conventional techniques of RFID circuit design and operation provides numerous alternate variations of RFID tags that may perform in accordance with the requirements of the method of the present invention, and that the details of the design and operation of the RFID tag 2 are illustrative and limiting to the scope of the claimed invention. An optional GPS receiver 4G is coupled with the controller 4A. The GPS receiver 4G may receive signals from the global positioning system ("GPS") and process said signals to generate a location information that indicates the geographic position of the GPS receiver 4G. The GPS receiver 4G may then communicate the location information to the controller for storage in the data memory 4C. The location information may be associated with other information stored in the data memory 4C, such as (1) text messages received RFID communications device 9, or (2) an identity of a requester of data associated with a request received at approximately the same time by the RFID tag 4 that the GPS signals used to generate location information were received.

Figure 2:
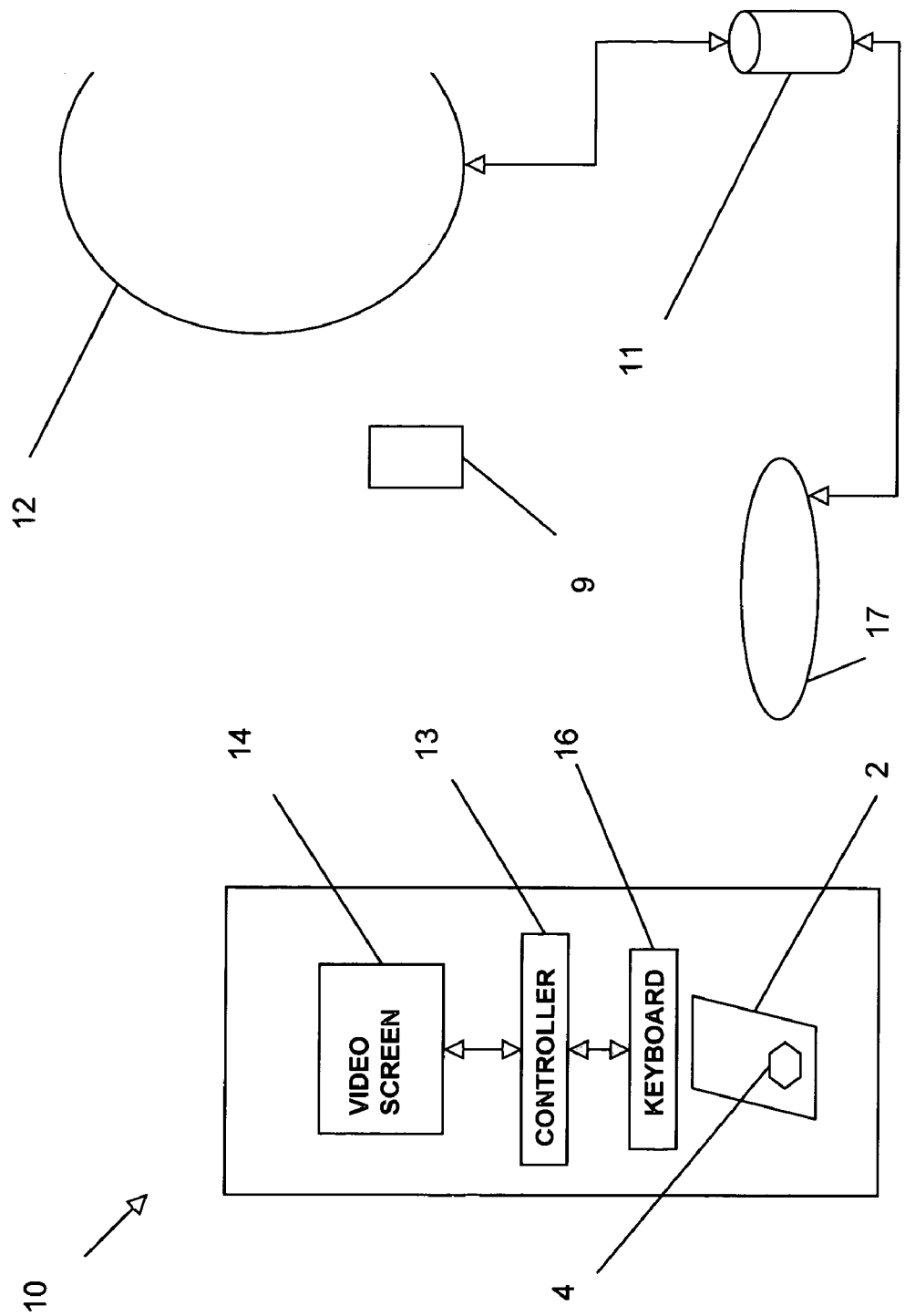
FIG. 2 is a drawing of an alternate preferred embodiment of the present invention including electronic information technology appliance having the RFID circuit tag of FIG. 1A.

Referring now generally to the Figures and particularly to FIG. 2, FIG. 2 is a drawing of an alternate preferred embodiment of the present invention including electronic information technology appliance 10 having the life document 4 comprising the RFID tag 2 of FIG. 1 A. The appliance 10 may be a portable computing device that receives data from and transmits data to a remote database 11 via the REID tag 2, a communications network 12 and the comms device 9. The communications network 12 may be an Intranet, an extranet, the Internet, or another suitable computer or communications network known in the art. The appliance 10 includes a controller module 13 coupled with a video screen 14 for data output and a keyboard 16 for data input. The data base 11 may contain a plurality of data records, whereby the origin and validity of the data stored in the REID tag 4 and the identity of the appliance 10 is confirmed by comparing data stored in the RFID tag 4 with data stored in the one or more of the data records stored in the remote database 11. This same technique of validation and authentication of the appliance 10 may be used to validate and authenticate the identity of the RFID doc 2 of FIG. 1 and of the data stored in the REID tag 4 of the corporate seal 6 of the REID doc 2.The identity of the appliance 10, and the validity of data provided by the appliance 10 via the REID tag 2 to the comms device 9 may be verified or authenticated by interaction with the comms device 9 and the remote database 11 via communication enabled by a computer network 17, such as an Intranet, an extranet, the Internet, or another suitable computer or communications network known in the art.

Figure 3:
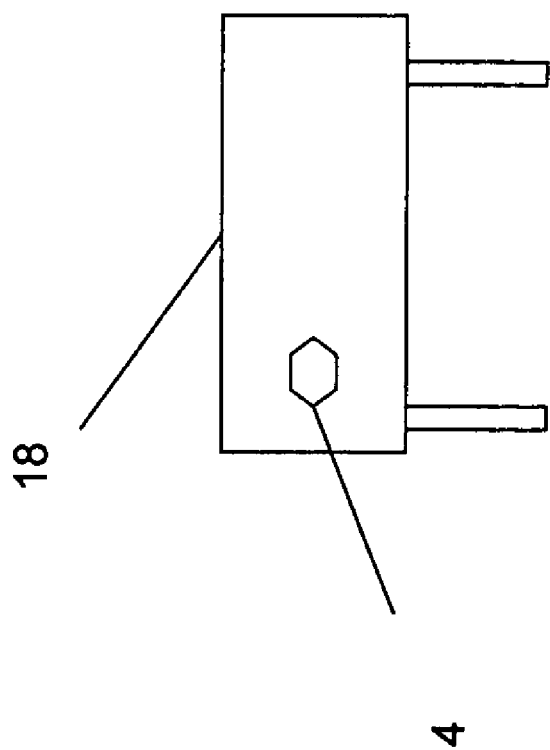
FIG. 3 presents an alternate preferred embodiment of the present invention including an RFID circuit tag of FIG. 1A attached to a desk.

Referring now generally to the Figures and particularly to FIG. 3, FIG. 3 presents an alternate preferred embodiment of the present invention including an RFID tag 4 of FIG.1A attached to a desk 18. The desk 18 is a physical asset , and the RFID tag 4 may contain ownership and encumbrance information, such as UCC lien information, describing the legal status of ownership rights of the desk 18. This information may be read from, written into, and/or stored in RFID tag 4 in accordance with the laws and regulations of the selected legal jurisdiction and/or to satisfy the legal notice requirements imposed by a judicial office or authority having jurisdiction over the owner, lienholder, or other party in interest to the desk 18. Alternatively or additionally, the information may be read from, written into, and/or stored in the RFID tag in accordance with the laws and regulations of the selected legal jurisdiction and/or to satisfy the legal standards required to permit the data stored in the RFID tag 4 to be admissible in a court of the jurisdiction of said judicial office or authority.

Figure 4:
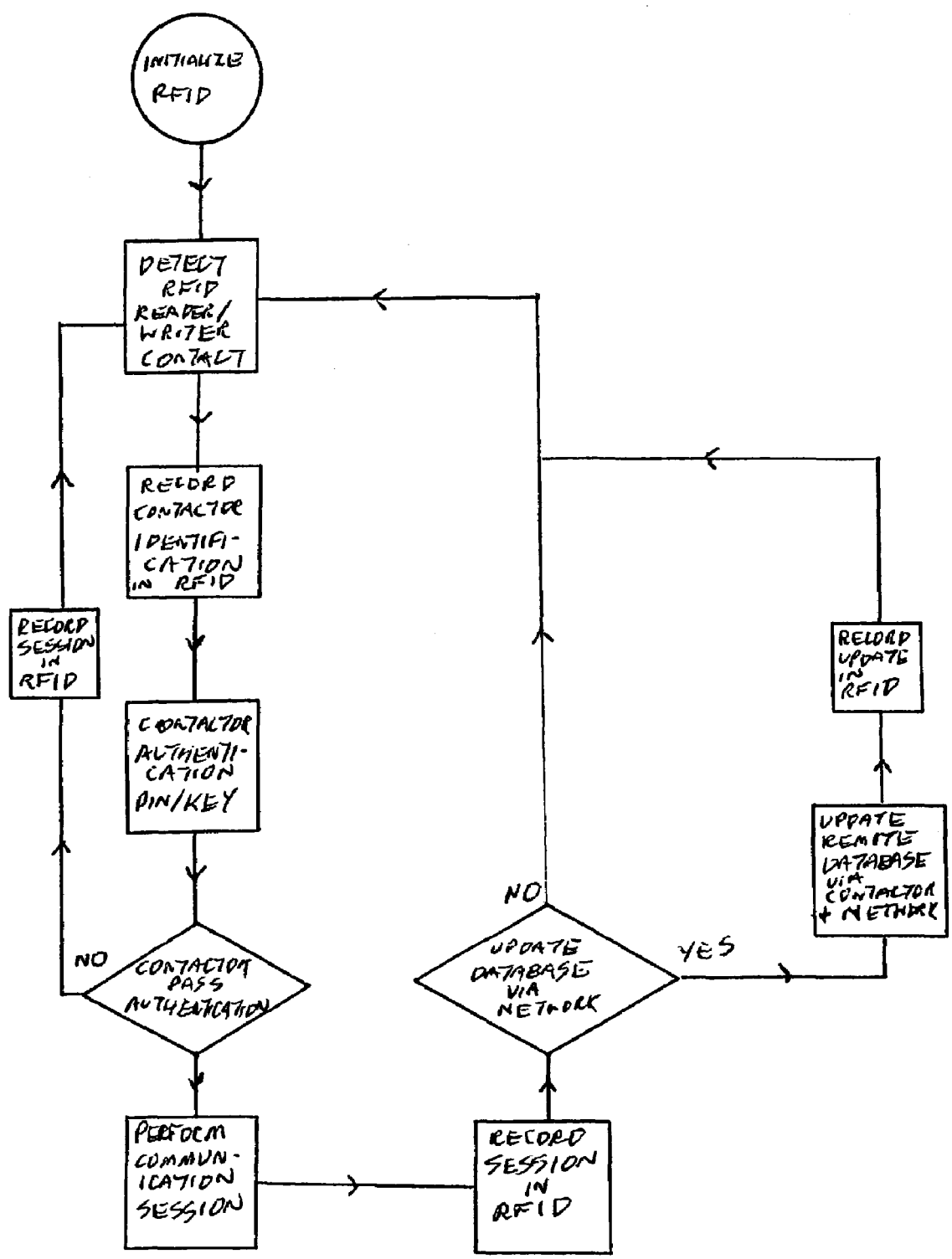
FIG. 4 is a process and software flow chart of a preferred embodiment of the method of the present invention that may be implemented using the RFID circuit tag of FIG. 1A and where the RFID circuit tag is coupled with the document of FIG. 1A, the electronic appliance of FIG. 2, or the desk of FIG. 3.

Referring now generally to the Figures and particularly to FIG. 4, FIG. 4 is a process and software flow chart of a preferred embodiment of the method of the present invention that may be implemented using the RFID circuit tag of FIG. 1A and where the RFID circuit tag is coupled with the document of FIG. 1A, the electronic appliance of FIG. 2, or the desk of FIG. 3. The RFID tag 4 is initialized by storing initialization data in the data memory 4C and optionally storing an operating software program in the operating memory 4B. The initialization data transmitted to and stored in the RFID tag 4 may comprise biometric data. The biometric data may be sourced or originated from an information requestor's DNA, or hand or fingerprints, or iris or pupil structures, or voice is recordings, or other suitable biometric data known in the art. The RFID tag 4 subsequently detects an attempt to access data stored in the data memory 4C by the comms device 9. The comms device 9 may in certain preferred embodiments of the present invention provide biometric data acquired from a human being via a biometric input system 19 in an effort to authenticate the identity of the requester of the data stored in the RFID tag 4. The RFID may optionally create a record of this communications attempt by the comms device 9 and store this record in the data memory 4C. Records of communications attempts by various comms devices 9 that document the identity of requesters of the data may optionally be stored and used as an audit trail to record the identity of agents having attempted to access, or successfully accessed, the data stored in the RFID circuit. The comms device 9 may send biometric data, an electronic signature message, or a PIN, or a PKI key in order to gain access to the data stored in the RFID tag 4. The RFID tag 4 may then process the biometric, electronic signature, or PIN, or PKI key via the security circuit 4F in order to determine if the comms device 9 is authorized to access data stored in the RFID tag 4. The RFID tag 4 may in certain preferred embodiments of the method of the present invention access data stored in the remote data base 11 to authenticate the identity of the comms device 9, or the to authenticate the identity of a person requesting access to the data of the RFID tag 4, and to determine if the comms device 9 and/or the requesting person is authorized to receive the data. This procedure may also be followed when the comms device 9 is attempting to write data into the RFID tag 2. Where the RFID tag 4 determines that the comms device 9 has not provided the necessary, or sufficient, biometric data, electronic signature, PIN or PKI key, the RFID tag 4 will deny the information request, record information concerning the failed attempt by the comms device 9, and return to a sensing state. Where the RFID tag 4 determines that the comms device 9 has provided necessary or sufficient biometric data, electronic signature, PIN or PKI key, the RFID tag 4 will approve or act on the information request, transmit the requested information to the comms device 9, record information concerning the failed attempt by the comms device 9, and return to a sensing state. It is understood that the comms device 9, when authorized by the RFID tag 4, may additionally or alternatively write information into the RFID tag 4. In certain still alternate preferred embodiments of the method of the present invention the RFID tag 4 may attempt to transmit a message to the remote database 11 via the comms device 9 and the network 17.

Figure 5:
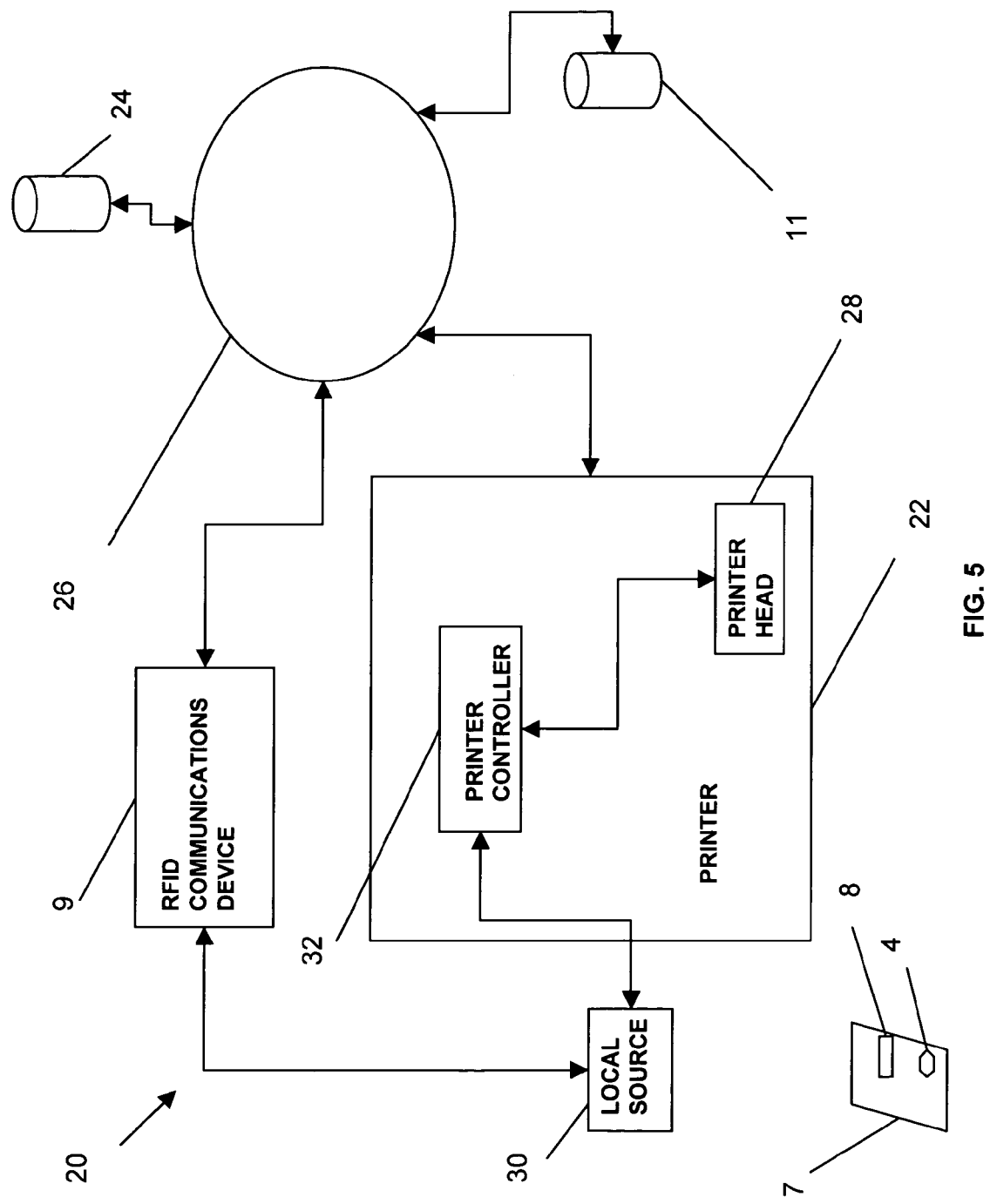
FIG. 5 is a yet alternate preferred embodiment of the present invention comprising a printer, a database communicating with the printer via the Internet, and the document and RFID circuit tag of FIG. 1A.

Referring now generally to the Figures and particularly to FIG. 5, FIG. 5 is a yet alternate preferred embodiment 20 of the present invention comprising a printer 22, a database 24 communicating with the printer 22 via the Internet 26, and the RFID tag 4 of FIG. 1A. The paper sheet 7 is inserted into the printer 22 whereby the visual pattern 8 is formed on the sheet 7 by the printer head 28. The comms device 9 accepts data from the remote database 11, database 24 via the communications network 12, the Internet 26 and/or a local source 30, such as a keyboard, and transmits the data to the RFID tag 4 to initialize the RFID tag 4 or to update the data stored in the RFID tag 4. A printer controller 32 receives data and instructions from the remote database 11 over the Internet 26 and via an interface circuit 34 and directs the printer head 28 and the comms device 9 to transmit and print data to the RFID doe 2 in accordance with the received data and instructions. Alternatively or additionally, the printer controller 32 may optionally receive data and/or instructions from the local source 30 and direct the printer head 28 and the comms device 9 to transmit and print data to the RFID doe 2 in accordance with the received data and instructions.

Figure 6:
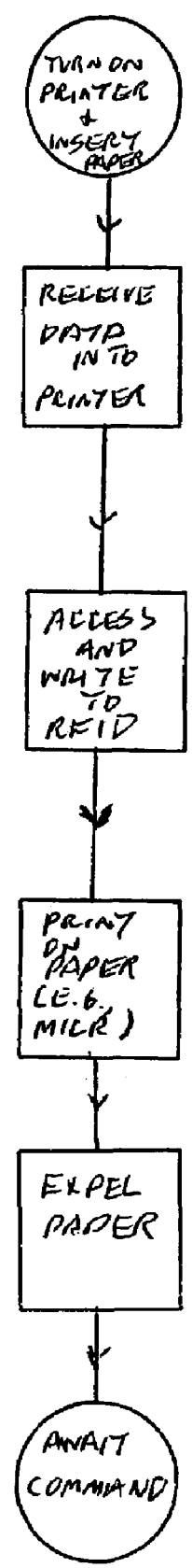
FIG. 6 is a process and software flowchart of an alternate preferred embodiment of the method of the present invention that may be implemented with the printer and database of FIG. 5, and the document and RFID circuit tag of FIG. 1A.

Referring now generally to the Figures and particularly to FIG. 6, FIG. 6 is a process and software flowchart of an alternate preferred embodiment of the method of the present invention that may be implemented with the printer 22 of FIG. 5, the database 11, the document and RFID circuit tag of FIG. 1A. The sheet 7 is placed into the printer 22, and data and/or instructions are received from the Internet 26 and/or the local source 30. The RFID is then accessed and written into, and the sheet 7 is printed on by the printer head 28 under the direction of the printer controller 32 and in accordance with the received data and instructions. The paper is then removed from the printer 22.

Figure 7:
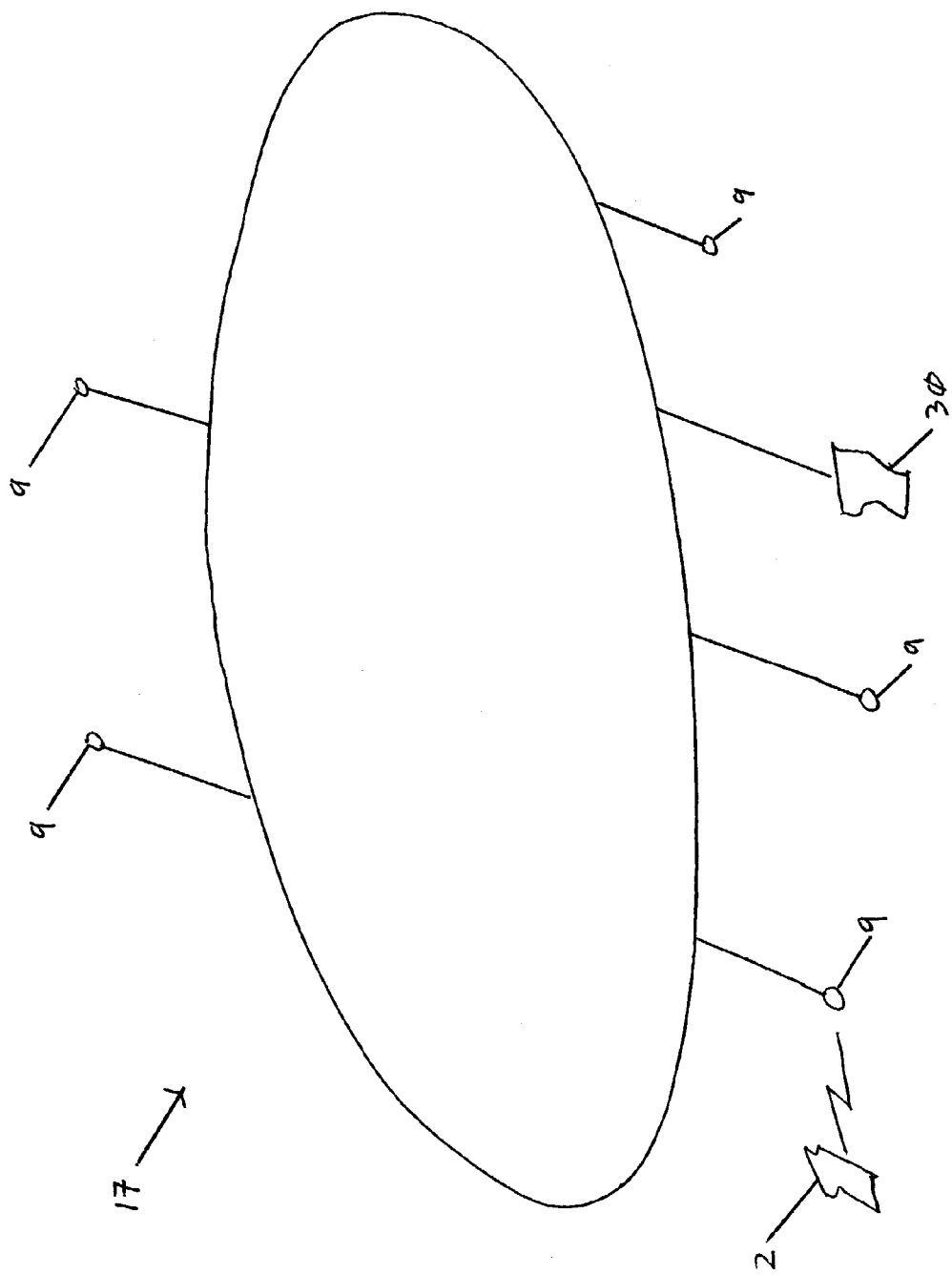
FIG. 7 is an illustration of a plurality of RFID communicators of FIG. 1A geographically distributed and in communication over the Internet and tracking the physical position of the document of FIG. 1A over time and as the document is moved between different locations.

Referring now generally to the Figures and particularly to FIG. 7, FIG. 7 is an illustration of a plurality of RFID communications devices 9 of FIG. 1A geographically distributed and in communication over the Internet 26 and tracking the physical position of the document of FIG. 1A over time and as the RFID doc 2 is moved between different locations. The tracking of the RFID doc 2 made possible by the periodic or asynchronous contacts between the RFID doc 2 and one or more of the comms devices 9 reduce the potential for loss, misplacement and misuse of the RFID doc 2. GPS data may optionally be recorded into the RFID doc 2 to create a record of the location of the RFID doc 2 at various moments.

Figure 8:
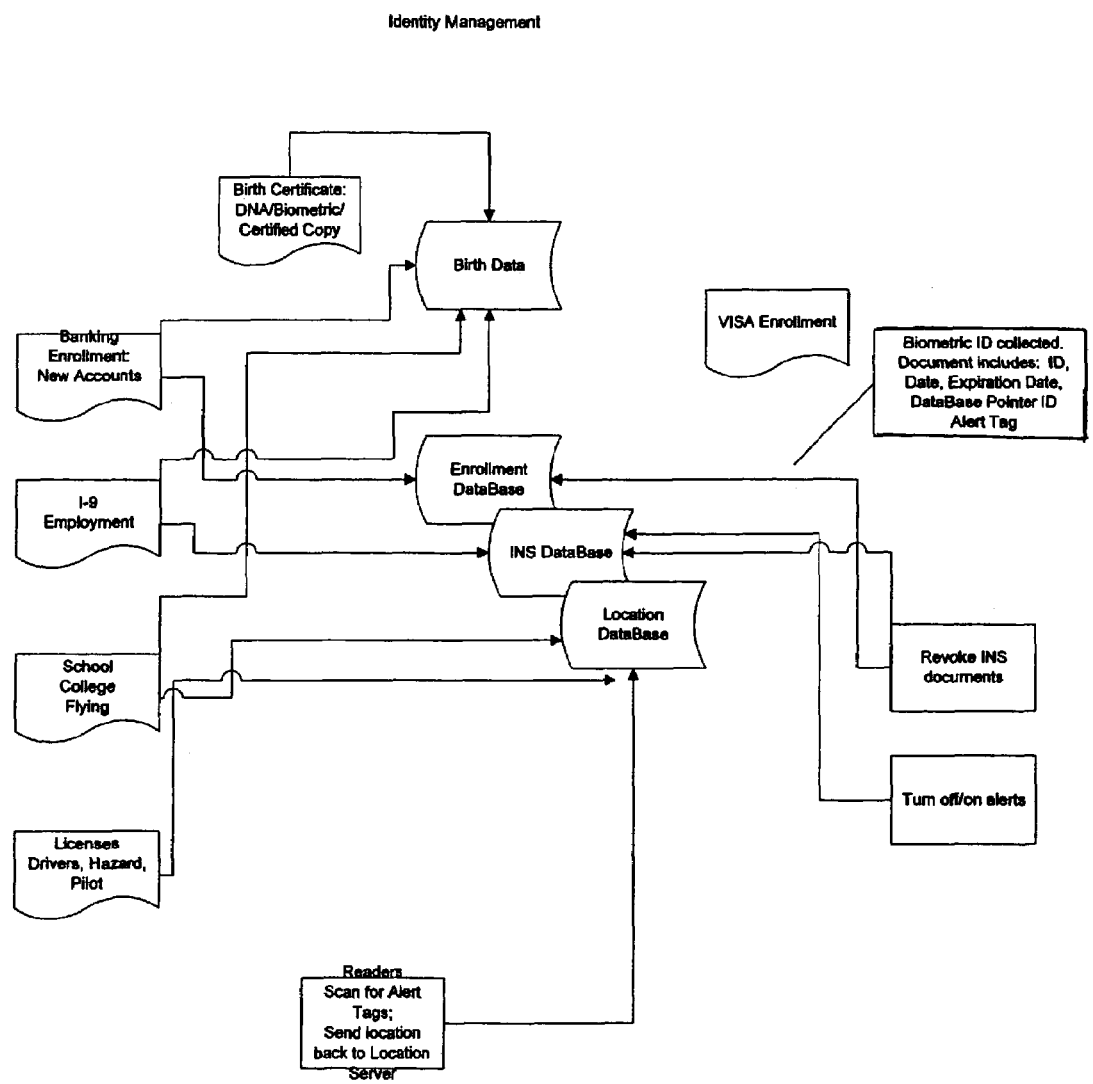
FIG. 8 is an illustration of the flow and interdependence of documents in referencing documents used to prove identity and associate vital records with specific individuals.

Referring now generally to the drawings and particularly to FIG. 8, FIG. 8 is a an illustration of the flow and interdependence of life documents 2 in referencing documents used to prove identity and associate vital records with specific individuals. The use of life documents 2 is often affected by the use of certified copies of such life documents 2. Prior art allows certified documents to flow through a network of identity checking activities without retaining a record of the history of individual accesses to the life document 2. Certain preferred embodiments of the method present invention enable the creation of an audit trail detailing who accessed, read, or wrote data to or from the life document 2, what data was read or added to the life document 2, when the data was read from or written into the life document 2, and where the life document 2 was at a particular instance of reading data from or writing data into the life document 2. Certain alternate preferred embodiments of the method present invention additionally enable the creation of an audit trail detailing who attempted to access, read or write data to or from the life document 2, what data was attempted to be read or added to the life document 2, when the data access, read or write attempt occurred, and where the life document 2 was at a particular instance of an attempted reading or writing of data from or into the life document 2.

The method of the present invention provides various embodiments that may optionally include, one, two, all or a plurality of the following aspects, capabilities, and/or components:

The use of a digital Electronic Document Code stored in one or more RFID tags attached to printed documents and used by authenticating entities to uniquely identify a legal document as a document created by the authenticating agency and which third parties can access in automated business processes to ascertain if a document is authentic.

The use of a digital Electronic Document Code stored in RFID tags and attached to printed documents, by authenticating entities or by the authorization of an appropriate entity, to uniquely identify (1) a particular instance of a document created by the authenticating agency and (2) the data referred to in the document.

The creation of an Electronic Document Code ("EDC") database stored and accessible on a computer network, preferably the Internet, which maintains a database of documents and the EDC printed on the document, and/or an Electronic Product Code ("EPC"). A new EDC record and/or an EPC record may be created or referred to by the authenticating agency for use in tracking each individual document. The EDC database may be proprietary to a particular authenticating agency or the authenticating agency may also decide to include the EDC in a public EDC database or EPC database stored on a network and accessible by third parties to authenticate or process a document.

The association of information, such as data denoting the existence of a legally recognized or enforceable lien, such as (1) a secured Lien, (2) lien issued in at least partial conformance of the Uniform Commercial Code, and (3) an other suitable lien known in the art, against an object, or a unit of a product type, or a document, with an EDC, an EDC record, an EPC, and/or an EPC record. The lien information may optionally identify (1) the lien itself by a serial number or other identifier, and/or (2) an aspect of the lien, such as the lien holder or the issuing authority of the lien.

The association within a database or by means of a database of (1) a plurality of EDC's, (2) a plurality of EPC's, and/or (3) a plurality of codes that include at least one EDC and at least one EPC.

The ability for (1) parties who originate and issue authenticated documents and optionally (2) third parties who process such documents, to use an EPC database, an EDC database, and/or a combined EDC and EPC database, as a means of maintaining status about a document. For instance, a certified birth document EPC or EDC may be updated to include a status code indicating the individual identified on the certificate died.

The use of a digital Electronic Document Code on one or more printed documents to store data related to the document or transactions related to the document, and/or the ability to use the EDC code as a pointer to a remote database utilizing the EDC code as a common identifier linking transactions related to the document and accessible to third parties when asked to provide services or benefits to the holder of a document which appears to be authentic.

The structure of a common Electronic Document Code which one or optionally multiple authenticating agencies and third parties can use to develop automated processes for detecting counterfeit documents.

The use of such digital Electronic Documents Codes by federal, state and local government agencies to identify and certify legal documents as authentic, in particular financial instruments, monetary notes, bills of currency, rebates, rebate coupons, coupons, birth certificates, death certificates, marriage licenses, divorce decrees and adoption documents. Monetary notes may include notes or currency bills having value denominations, such as (1) dollar bills issued by the United States Treasury, or (2) a monetary note, bill of currency, or financial instrument issued by a government, an agency, a corporation, an institution, an association, or an entity.

The use of digital Electronic Document Codes applied and attached various types of documents used in commercial financial transactions by authenticating entities enabling third parties to validate the document and data related to the document is authentic, including checks, corporate shares, bonds, and currency.

The use of a Electronic Document Code by the authenticating agency and third parties who process such documents to utilize the EDC as a means of attaching other data attributes to the document, such as status codes. For instance, if a third party cashes a check, the automated processes may include a data attribute to the EPC database or EDC indicating that a third party cashed the check.

The flexibility of the design of the EPC database, EDC database, and/or combined EPC and EDC database ("combined database") to store data or provide links to data depending upon the attributes of the RFID tag used. For instance, some RFID tags would permit the EPC, EDC, and/or combined database to identify or be used to identify the authenticating entity and a unique serial number of a document or a particular unit of a type of product. Automated business processes may optionally access a record of the EPC, EDC or combined database, wherein the record was created when the document or unit was created in order to enable to access to, and the ability to process, data related to the document or unit. In other instances, the design of the RFID tag may enable the authenticating entity and third parties to read, write and store document data within the RFID tag attached to the document.

Generating or employing an Electronic Document Code that may optionally be stored in either write-once read-many memory, or by other suitable devices or methods known in the art that can ensure that a stored EDC cannot be modified.

The use of RFID tags to identify and/or validate the authenticating agency who created the document, i.e. the originating agency, in a manner similar to or the same as (1) a corporate seal printed on a document does today to signify authenticity for the entity creating the document, and/or (2) an MICR coding on a check might imply or certify that a check was printed by a bank.

Creating and managing a database of Electronic Document Codes on a network which can associate related dynamic data either (1) stored with an EDC record, and EPC record, or (2) available through a link to the data file specified with an EDC record or an EPC record. An EDC record includes the unique EDC of a particular document, or associated with a particular document, and enables an association of, or is used to associate, additional data with the instant EDC. An EPC record includes the unique EPC of a particular unit of a type of product, or associated with a particular unit of a type of product, and enables an association of, or is used to associate, additional data with the instant EPC.

The use of digital Electronic Document Codes stored in RFID tags by state and local registrars or third parties and attached on life event documents such as birth certificates and death certificates to (1) link birth certificates with future life events such as marriage, divorce or death, and/or (2) enable the cross matching of death registration records with birth registration records.

An Electronic Document Code that shall infer the same rights and privileges as a corporate seal printed on paper documents.

An intelligent Electronic Document Code enabling automated business processes to access hidden or remote data that is not printed or visible on a document An intelligent Electronic Code enabling automated business processes to access hidden or remote data to match and validate data printed on the document Associating a unique database record identifying the database record that an originating or authenticating agency, or its agents, used as source data and distributed as certified life event data, which can optionally be accessed or validated from a remote database Embedding the unique electronic digital document code, where the EDC itself identifies, or indicates by reference to a database, (1) the identity or an identifier of an originating or authenticating agency of the document, (2) the printed transaction as either part of a preprinted form or added as part of a forms printing process hidden as digital data embedded or attached to a paper document, and (3) user profiles enabling third parties to access, read, write or update such hidden data. The hidden data may optionally comprise identity data or an account number such as a Social Security Number or a DNA sequence.

The inclusion of unique digital identity information collected and stored as part of the birth registration process. Such unique identity information can subsequently be stored and distributed for use in other transactions or business processes.

The ability to distribute said certified information in a chip which can be embedded within, or attached to, a human body or the body of a living being.

The ability for third parties to read the personal identity data embedded in a life document RFID tag and extract and store such identity data as part of a transaction record requiring proof of identity which may augment or replace the requirement for individuals to have a notary public validate their identity. Optionally, the third party may use the database key contained in the RFID tag to access a remote data base to authenticate and store personal identity information.

A redundant system for both printing information onto paper and also storing either all or portions of the printing information in the form of digital data in a RFID tag that is integrally embedded within the paper.

Means for determining both the authenticity and accuracy of information printed on paper using data stored on a silicon chip embedded within the paper.

A composite electronic and paper document wherein the printed paper document displays data stored in a silicon chip embedded within the document.

Means for creating a three-way link between the printed information on a document, the electronic information stored in a silicon chip embedded within the document, and the identity of the person possessing the document.

An integrated device for both printing on paper, writing data into, and reading data out RFID tags embedded into such paper.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A life document, the life document communicatively coupled with a software data base via an electronic communications network, and the life document comprising:

a printable media, the printable media having a display surface, the display surface visually presenting information via visible symbols;

an RFID device, the RFID device physically coupled with the printable media, and the RFID device comprising a radio frequency transceiver, a controller, and a writeable memory;

the radio frequency transceiver coupled with the controller and the writeable memory;

the controller for directing information received by the radio transceiver into the writeable memory and for broadcasting information stored in the RFID device; and the writeable memory containing vital records information and an electronic document code associated with a person, and the electronic document code including a pointer to a software data base wherein a revocation of the life document is recorded.

2. The life document of claim 1, wherein the person is deceased.

3. The life document of claim 2, wherein the media is a document selected from the group of documents consisting of a birth certificate, a death certificate, a marriage certificate, an adoption certificate, a will, a deed for real property, and a certified copy of a document.

4. The life document of claim 2, wherein the RFID device stores information revoking at least some vital records information stored in the life document.

5. The life document of claim 2, wherein the RFID device stores information revoking information visibly presented on the printed media.

6. The life document of claim 2, wherein the RFID device stores information revoking the life document.

7. The life document of claim 2, wherein the electronic communications network comprises the Internet.

8. The life document of claim 1, wherein the RFID device further comprises a GPS receiver, the GPS receiver coupled with the controller, and the GPS receiver for determining the geographic location of the life document by receiving and processing GPS signals by the RFID device.

9. A method for revoking a certified copy of a document, the certified copy comprising a media sheet and an RFID device, the RFID device communicatively coupled with a data base via an electronic communications network, the method comprising:

coupling the RFID device to the media sheet, the RFID device comprising a writeable electronic memory;

associating the certified copy with a unique electronic document code, the electronic document code associated with a pointer to the data base;

recording the electronic document code and the pointer within the writeable electronic memory of the certified copy;

accessing a revocation of the certified copy stored in the data base via the electronic communications network and as directed by the pointer; and storing a revocation of the certified copy in the RFID device.

10. The method of claim 9, wherein the document is a birth certificate.

11. The method of claim 9, wherein the document is selected from the group consisting of a death certificate, a marriage certificate, an adoption certificate, a will, and a deed for real property.

12. The method of claim 9, wherein the electronic communications network comprises the Internet.

13. The method of claim 9, wherein the RFID device further comprises stored information selected from the group of information consisting of biometric data, personal identification data, financial information, an educational record, immigration data, passport data, vehicle license data, an employment record, lien information, and medical data.

14. The method of claim 9, wherein the document is a document selected from the group consisting of a rebate, a coupon, a monetary note, a currency bill, a lien document, and a financial instrument.

* * * * *